US008698490B2

(12) United States Patent
Ausserlechner

(10) Patent No.: US 8,698,490 B2
(45) Date of Patent: Apr. 15, 2014

(54) MAGNETORESISTIVE ANGLE SENSORS HAVING CONDUCTORS ARRANGED IN MULTIPLE PLANES

(75) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 483 days.

(21) Appl. No.: 12/969,093

(22) Filed: Dec. 15, 2010

(65) Prior Publication Data

US 2012/0153947 A1 Jun. 21, 2012

(51) Int. Cl.
*G01B 7/30* (2006.01)

(52) U.S. Cl.
USPC ............................ 324/207.21; 324/207.25

(58) Field of Classification Search
USPC .......................................... 324/207.2–207.25
See application file for complete search history.

(56) References Cited

U.S. PATENT DOCUMENTS

| | | | | |
|---|---|---|---|---|
| 4,012,781 | A | * | 3/1977 | Lin ................................ 360/315 |
| 5,027,243 | A | * | 6/1991 | Gill et al. ....................... 360/315 |
| 5,216,560 | A | * | 6/1993 | Brug et al. ................. 360/327.33 |
| 5,715,121 | A | * | 2/1998 | Sakakima et al. ........... 360/324.2 |
| 6,150,809 | A | * | 11/2000 | Tiernan et al. ................. 324/238 |
| 6,522,128 | B1 | * | 2/2003 | Ely et al. ................... 324/207.17 |
| 6,700,371 | B2 | * | 3/2004 | Witcraft et al. ................ 324/252 |
| 7,629,789 | B2 | | 12/2009 | Paul et al. |
| 2002/0041514 | A1 | * | 4/2002 | Scheler et al. ................. 365/158 |
| 2005/0088175 | A1 | * | 4/2005 | Chilcote et al. ............... 324/252 |
| 2006/0038558 | A1 | * | 2/2006 | Rempt et al. .................. 324/238 |

OTHER PUBLICATIONS

Bartos et al., "A Novel Magnetoresistive Angle Sensor for 360° Detection", 7th Symposium on MR Sensors, Wetzlar, Mar. 11-12, 2003, 4 pages.
Ina et al., *360-Degree Rotation Angle Sensor Consisting of MRE Sensors with a Membrane Coil*, pp. 1-15, as posted on Jun. 1, 2011, at http ://www.docstoc.com/docs/80764313/360-degree-Rotation-Angle-S ensor-Consisting-of-MRE-Sensors-with-a.
Hlplanar Technik, *Magnetic Field Sensor KMR 360 (preliminary)*, pp. 1-6, retrieved on Nov. 5, 2013 at http://www.jinzon.com/pdf/KMR360eng.pdf.
Bartos et al., *A Novel Magnetoresistive Angle Sensor for 360° Detection*, 4 pages, dated Mar. 11-12, 2003.

* cited by examiner

*Primary Examiner* — Jay Patidar
(74) *Attorney, Agent, or Firm* — Patterson Thuente Pedersen, P.A.

(57) ABSTRACT

Magnetoresistive angle sensors, sensor systems and methods are disclosed. In an embodiment, a magnetoresistive angle sensor includes a first plurality of conductors arranged in parallel with one another in a first plane to form a first array; a second plurality of conductors arranged in parallel with one another in a second plane to form a second array, the second plane being different from and spaced apart from the first plane, and the second plurality of conductors being orthogonally arranged with respect to the first plurality of conductors; and at least one magnetoresistive element disposed between the first plane and the second plane.

25 Claims, 9 Drawing Sheets

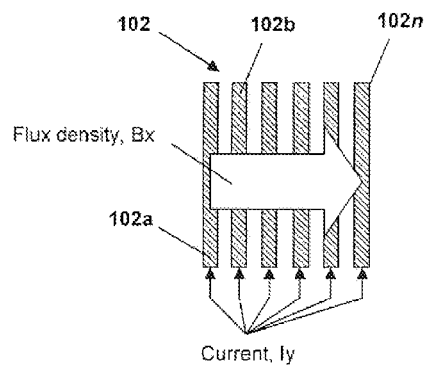
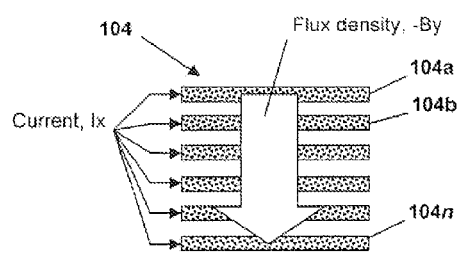
FIG. 1A          FIG. 1B
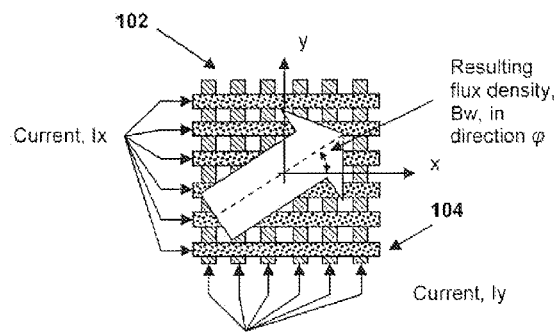
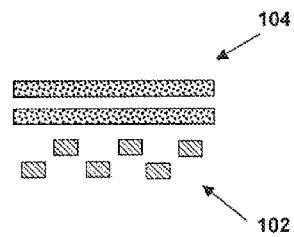
FIG. 1C          FIG. 1D

MAGNETORESISTIVE ANGLE SENSORS HAVING CONDUCTORS ARRANGED IN MULTIPLE PLANES

TECHNICAL FIELD

The invention relates generally to integrated circuits and more particularly to integrated circuit magnetoresistive angle sensors.

BACKGROUND

Magnetoresistive (MR) angle sensors typically are thin, flat structures formed on a main surface of a substrate, such as a semiconductor die. The projection of a magnetic field onto this main surface is referred to as the in-plane magnetic field. MR sensors directly measure the angle between the in-plane magnetic field and a reference direction in the main surface. MR sensors generally do not, however, measure the magnitude of the magnetic field. In many applications, this is a drawback. For example, MR angle sensors typically comprise a small permanent magnet that is attached to the shaft and whose position is to be measured. This magnet, however, can become unattached, chipped or broken, or can attract a loose piece of metal that shorts a portion of the magnetic field. These and other situations can provide angle measurement errors that often cannot be detected. It can also be beneficial to monitor the strength of the magnet over time to detect lifetime drift or corrosion or to detect whether strong magnetic fields from nearby machines and systems are acting on the sensor.

One particular type of MR sensor is an anisotropic MR sensor, or AMR sensor. AMR sensors are often less expensive, more accurate and more robust than other sensors. AMR sensors can also measure magnetic field angle but only between 0 degrees and 180 degrees. For some applications, such as steering angle position sensing, it is desired to measure an entire resolution, from 0 degrees to 360 degrees.

MR sensors are also subject to hysteresis due at least in part to impurities in the MR layers, which means that the output signal lags the true angle of the applied magnetic field by about 0.1 degrees to about 1 degree. This is another drawback associated with conventional MR sensors.

Therefore, there is a need for an improved MR sensor.

SUMMARY

Magnetoresistive angle sensors, sensor systems and methods are disclosed. In an embodiment, a magnetoresistive angle sensor comprises a first plurality of conductors arranged in parallel with one another in a first plane to form a first array; a second plurality of conductors arranged in parallel with one another in a second plane to form a second array, the second plane being different from and spaced apart from the first plane, and the second plurality of conductors being orthogonally arranged with respect to the first plurality of conductors; and at least one magnetoresistive element disposed between the first plane and the second plane.

In an embodiment, a method comprises providing a first plane of parallel conductors spaced apart from and orthogonally arranged relative to a second plane of parallel conductors; providing at least one magnetoresistive element between the first and second planes; measuring a first angle of an applied magnetic field with no current applied to the first or second planes of parallel conductors; and measuring a second angle of an applied magnetic field with a first current applied to the first and second planes of parallel conductors.

In an embodiment, a method comprises providing a first conductor comprising a plurality of serially connected conductor portions arranged substantially in parallel; providing a second conductor comprising a plurality of serially connected conductor portions arranged substantially in parallel; providing at least one magnetoresistive element; arranging the first and second conductors substantially parallel to and spaced apart from one another, the conductor portions of the first conductor being substantially perpendicular with respect to the conductor portions of the second conductor; arranging the at least one magnetoresistive element substantially parallel to and between the first and second conductors; applying a first magnetic field; measuring a first angle of the first magnetic field; inducing a second magnetic field by causing a current to flow in at least one of the first or second conductors; and measuring a second angle of a magnetic field resulting from the first magnetic field and the second magnetic field.

BRIEF DESCRIPTION OF THE DRAWINGS

The invention may be more completely understood in consideration of the following detailed description of various embodiments of the invention in connection with the accompanying drawings, in which:

FIG. 1A depicts a conductor grid according to an embodiment.

FIG. 1B depicts a conductor grid according to an embodiment.

FIG. 1C depicts the conductor grids of FIGS. 1A and 1B together according to an embodiment.

FIG. 1D depicts a side view of the conductor grids of FIG. 1C with each conductor grid arranged in a plurality of planes according to an embodiment.

Figure 2A:
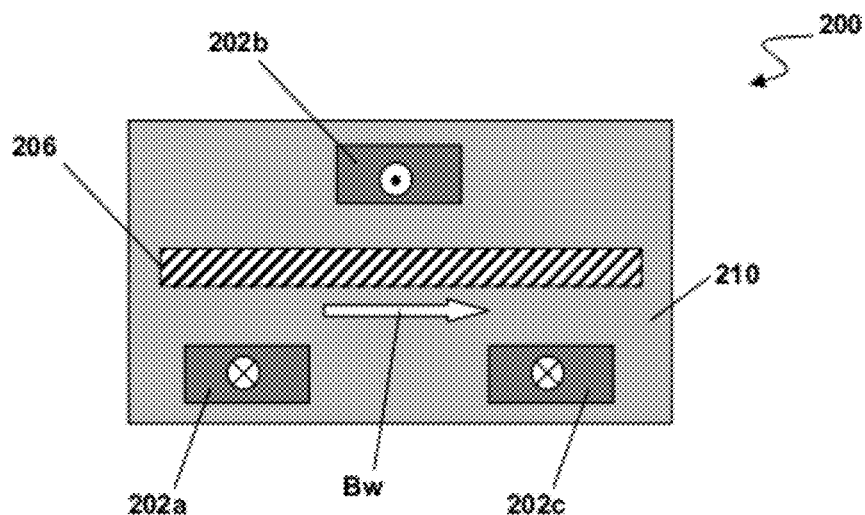
FIG. 2A depicts a cross-sectional view of a sensor system according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to magnetoresistive (MR) sensors for measuring the magnitude of a magnetic field while also measuring an angle of the magnetic field for a full 360 degrees and reducing magnetic hysteresis. In one embodiment, these and other advantages can be provided by arranging an orthogonal current grid proximate an MR resistor. The MR sensors can comprise AMR, giant MR (GMR) and/or tunneling MR (TMR) technologies in embodiments, referred to herein generally as XMR.

Referring to FIG. 1, FIG. 1A depicts a first current conductor grid 102. A current Iy can flow in the direction indicated, resulting a flux density Bx. FIG. 1B depicts a second current conductor grid 104. Each array or grid 102 and 104 comprises a plurality of conductors 102a-102n and 104a-104n. Current grids 102 and 104 are disposed in different planes in an embodiment. A current Ix and flux density −By are also depicted. In an embodiment, conductors 102a-102n and 104a-104n are about 1 µm wide wires and spaced apart by about 0.6 µm. The particular orientations of grids 102 and 104 and the currents and flux densities are not limiting but rather indicative of one example embodiment. Additionally, grids 102 and 104 can comprise more or fewer conductors and/or conductors having other relative sizes and/or configurations in other embodiments. In embodiments, grids 102 and 104 comprise ordinary aluminium wiring of standard CMOS or BIPOLAR semiconductor technologies, but if the aluminium wires are not able to carry the high current densities, such as because of electromigration limitations, copper wires can be used, which can reduce the hazard of electromigration and also the self-heating of the circuit.

FIG. 1C depicts grid 104 superimposed on grid 102. This arrangement results in a flux density Bw in the direction φ when currents Ix and Iy flow. The direction and magnitude of Bw are determined by the layouts of grids 102 and 104, the relative placement thereof, and the values of currents Ix and Iy. Therefore, a sensor system comprises grids 102 and 104 and at least one XMR resistor disposed proximate thereto.

To reduce die area and current requirements, the individual conductors of each of grids 102 and 104 are serially connected in embodiments. Further, while grids 102 and 104 occupy different but parallel planes in embodiments, the relative arrangement of the planes as well as of the XMR resistors can vary. In one embodiment, the MR resistors are disposed between the planes of grid 102 and 104, with the conductors 102a-n and 104a-n of each grid connected in series and in an alternating fashion.

In other embodiments, one or both of grids 102 and 104 each comprise to plurality of planes. For example, as depicted in FIG. 1D, grid 102 can be split into two planes, and grid 104 can also be split into two planes. Such an embodiment therefore comprises four conductor planes, two for each of grids 102 and 104.

Figure 2B:
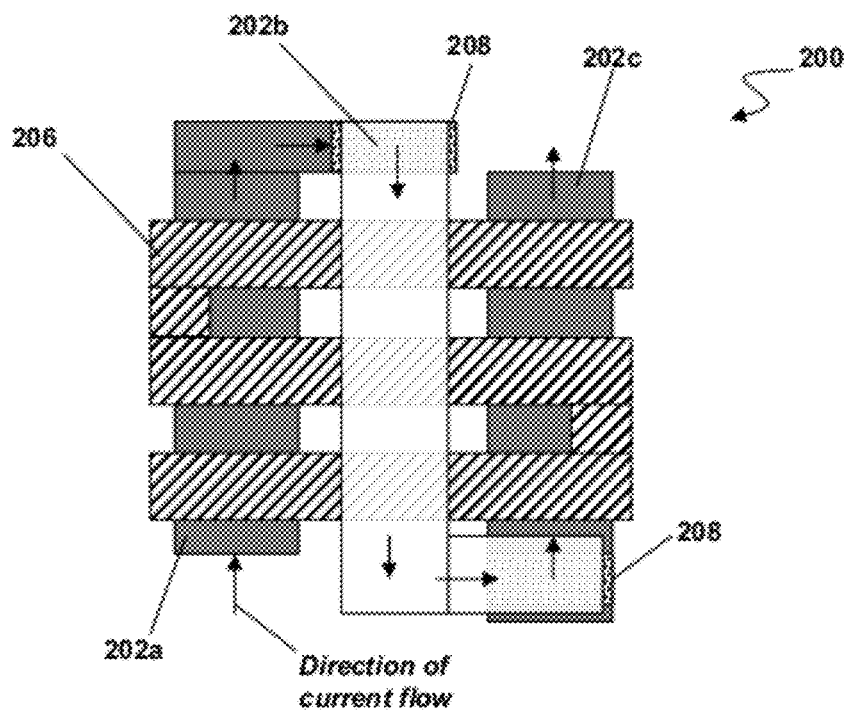
FIG. 2B depicts a top view of the sensor system of FIG. 2A.

FIG. 2 depicts an example embodiment of a sensor system 200. In system 200, a first conductor 202b is arranged in a first plane, and second and third conductors 202a and 202c are arranged in a second plane, with a MR strip 206 disposed therebetween. Vias 208 couple the upper and lower conductor planes. FIG. 2A also includes an isolation layer 210. Sensor system 200 can comprise a plurality of isolation layers in embodiments.

Grids 102 and 104 cover all of the XMR resistor in an embodiment. In embodiments comprising a plurality of XMR resistors, all are located within the perimeter formed by grids 102 and 104. Other embodiments of system 200 can comprise one or more XMR resistors 206. Further, XMR resistors 106 can comprise AMR, giant magnetoresistive (GMR) or some other suitable MR technology.

Figure 3:
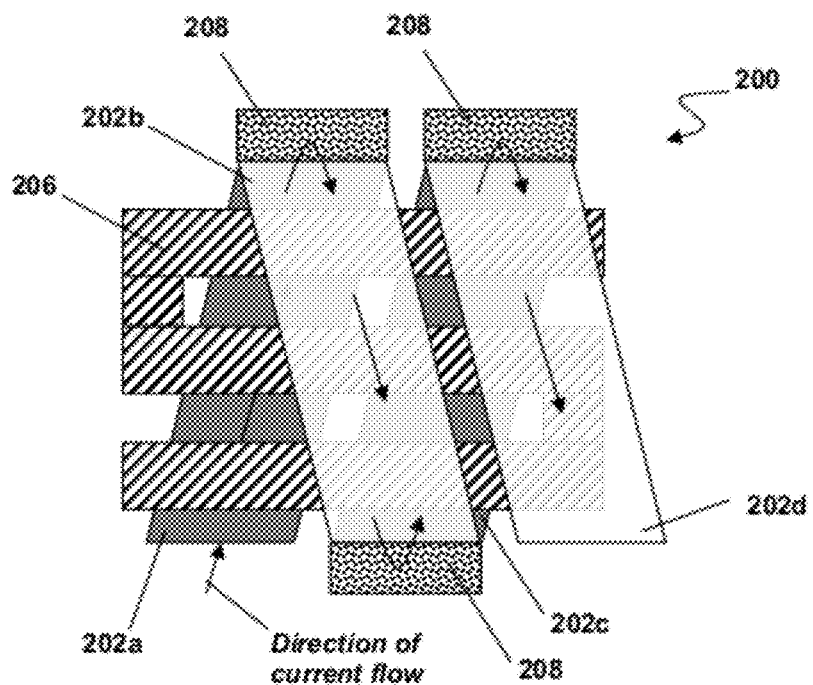
FIG. 3 depicts a conductor configuration according to an embodiment.

To reduce the number of conductor planes, another embodiment makes use of the area above and below MR strip 206 by tilting the conductors 202 as depicted in FIG. 3. In FIG. 3, conductor 202 comprises four conductor portions 202a-d, with XMR resistor 206 disposed between the planes of conductor 202, though more or fewer conductor portions and/or XMR strips can be used in other embodiments. Vias 208 connect conductor portions 202a-d disposed in different conductor planes.

Figure 4:
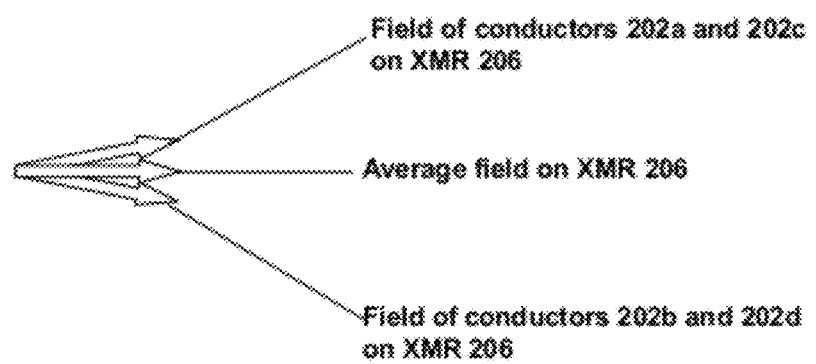
FIG. 4 depicts magnetic field direction according to the embodiment of FIG. 3.

In such an embodiment, the contributions from conductors 202a and 202c in the first plane and conductors 202b and 202d in the second plane to the Bw field are not exactly parallel, as is illustrated in FIG. 4, leading to small out-of-parallel components. If the sum of the contributions from the upper and lower conductors is equal, however, the components effectively cancel each other.

System 200 can compare measured angles with and without currents Ix and Iy to obtain additional information on the magnitude and the half-space, e.g., 0-180 degrees or 180-360 degrees, of the applied magnetic field. Additionally, current Ix and Iy can superimpose a magnetic dither field of sufficient strength that the magnetic history of system 200 is reduced or eliminated, thereby reducing the magnetic hysteresis. Referring again to FIG. 1, in the embodiment in which conductors 102a-102n and 104a-104n are about 1 µm wide and spaced about 0.6 µm apart and currents Ix and Iy are about 1 mA, an average Bx-field of about +/−0.4 mT is produced on XMR 206 with an average in-plane field of about 0.566 mT in any direction and covering a full 0-360 degree range as discussed in more detail below.

Figure 5:
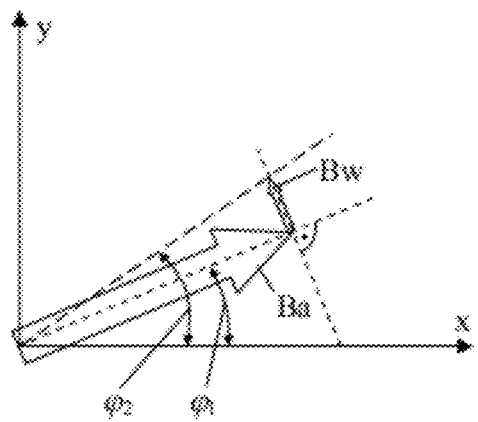
FIG. 5 is a diagram of magnetic fields and angles according to an embodiment.

Referring also to FIG. 5, in use, sensor system 200 powers on and begins to measure angle $\phi_1$ of the applied magnetic field, Ba, without passing current through grids 102 and 104. Then, current is applied to grids 102 and 104, resulting in a superimposed in-plane magnetic field Bw which is perpendicular to Ba and also typically an order of magnitude smaller than Ba. Then a second angle $\phi_2$ is measured, which is different from $\phi_1$ because of the addition of Bw:

$$\tan(\varphi 2 - \varphi 1) = \frac{Bw}{Ba}$$

Because Bw is known, Ba can be estimated:

$$Ba = \frac{Bw}{\tan(\varphi 2 - \varphi 1)} = \sqrt{\frac{(Cx*Ix)^2 + (Cy*Ix)^2}{\tan(\varphi 2 - \varphi 1)}}$$

Cx and Cy are constants of approximately 0.4 µT/µA, though they are not identical because one grid, 104, is closer to XMR resistor 106 than the other grid 102. Thus, the magnitude of the magnetic field, Ba, can be determined.

This methodology works best if Ba and Bw are not significantly different. For example, if Ba is about 50 mT and Ba is about 5 mT, $\phi_2-\phi_1$ is about 6 degrees. If the accuracy of the XMR angle measurement is about 0.6 degrees, the sensor system can estimate Ba with an accuracy of about 0.6/6=10%. Note that the accuracy of an XMR angle measurement can be only about 1.5 degrees in the full range of 0-360 degrees, yet it is much better in a narrow range of $\phi_1$-$\phi_1$+6 degrees. If the applied field is only about 25 mT, the accuracy in the estimation of Ba increases by a factor of 2 to about 5%. If the applied field is four times larger (200 mT) the accuracy is four times smaller (40%).

It is therefore possible to adjust the current through grids 102 and 104 accordingly, if power consumption of the sensor system is not a significant concern. In embodiments it may not be necessary to perform this kind of measurement continuously; instead it may be enough to do it, for example, only after power on or every second once for a period of 1 ms so that the duty-cycle is 0.1%. Other possibilities also exist.

It is possible to change the sign of both currents Ix and Iy simultaneously in an embodiment and measure a third angle $\phi_3$. Then the difference $\phi_3$-$\phi_2$ is twice as large as $\phi_2$-$\phi_1$. The applied in-plane field magnitude is then:

$$Ba = \frac{2*Bw}{\tan(\varphi_3 - \varphi_2)} = 2*\sqrt{\frac{(Cx*Ix)^2 + (Cy*Ix)^2}{\tan(\varphi_3 - \varphi_2)}}$$

and thus the accuracy of the Ba-estimation is twice as large.

It is an advantage of embodiments of this method that it measures only the in-plane field magnitude, not the out-of-plane magnitude, which is irrelevant for the performance of XMR angle sensors. Therefore it would be possible to have a strong magnetic field perpendicular to the XMR devices without affecting the angle measurement.

It is not necessary to apply both currents Ix and Iy simultaneously. Alternatively, the currents can be applied consecutively in embodiments as follows:

Apply only positive $Ix$ => measure $\varphi_1 : \tan(\varphi_1) = \frac{Ba*\sin(\varphi)}{Ba*\cos(\varphi) + Cx*Iy}$.

Apply only negative $Ix$ => measure $\varphi_2 : \tan(\varphi_2) = \frac{Ba*\sin(\varphi)}{Ba*\cos(\varphi) + Cx*Iy}$.

Apply only positive $Iy$ => measure $\varphi_3 : \tan(\varphi_3) = \frac{Ba*\sin(\varphi) + Cy*Ix}{Ba*\cos(\varphi)}$.

Apply only negative $Ix$ => measure $\varphi_4 : \tan(\varphi_4) = \frac{Ba*\sin(\varphi) - Cy*Ix}{Ba*\cos(\varphi)}$.

With these four measurements it is straightforward to extract an estimate for Ba:

$$Ba = \sqrt{\left(\frac{2*Cx*Iy}{ctg(\varphi_1) - ctg(\varphi_2)}\right)^2 + \left(\frac{2*Cy*Ix}{ctg(\varphi_3) - ctg(\varphi_4)}\right)^2}$$

It is also possible to use only one current grid. For example, in one embodiment only current grid 102 is used. If, in operation, it happens often enough (e.g. in motor drives) that the applied field Ba points in a positive or negative y-direction, the sensor system can apply Iy to generate a field Bw which points in a positive or negative x-direction. Therefore, Bw is perpendicular to Ba, and the system can use the measured angles with and without Bw to estimate the amplitude of Ba. In practice, the field Ba might not point accurately in the y-direction because the sensor system cannot sample the magnetic field exactly at the right moment, particularly if the speed of the rotating magnet is high. In this case the sensor system can account for the small misalignment of Ba in the moment of sampling and can even take account of a change in $\phi$ during the measurement with and without Bw as explained in the non-limiting example that follows.

Figure 6:
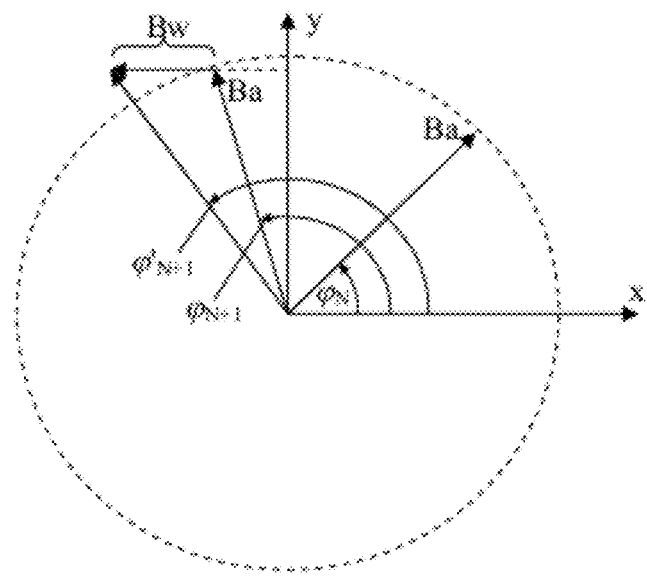
FIG. 6 is a diagram of magnetic fields and angles according to an embodiment.

Referring to FIG. 6, suppose that sensor system 100 works with a constant clock base and samples the angle $\phi$ at equidistant points in time, for example every T=80 μs. Sensor system 100 can then estimate the speed of rotation by:

$$\omega = \frac{\varphi_{N+1} - \varphi_N}{T}$$

with $\phi_N$, $\phi_{N+1}$ being the Nth and (N+1)th sample of the angle in time. Due to the large moment of inertia, the shaft does not change its speed of rotation significantly during two successive samples. Therefore, with each sampled angle system 200 can estimate if the next sample will cross the 90 degree point. If the rotation angle $\phi$ crosses the angle +/−90 degrees, the applied field is parallel or anti-parallel to the y-axis. If this event is detected, a current Iy is passed through the current grid 102 during the entire subsequent 80 us period. Thus, during this period the angle is shifted not only due to the speed of the shaft but also due to the additional field Bw of the current grid.

If no current is flowing in grid 102 (Iy=0), only the applied magnetic field originating from the magnet attached to the rotating shaft is present. FIG. 6 depicts the relevant event that the Nth sample of the rotation angle is smaller than 90 degrees ($\phi_N$<90) whereas the (N+1)th sample would be greater than 90 degrees ($\phi_{N+1}$=$\phi_N$ωT>90). Thus, after the Nth sample, a current Iy is passed through current grid 102 and generates a field Bw that is not perfectly orthogonal to the applied field but is perfectly orthogonal to the y-axis, with the y-axis defined by the direction of premagnetization for GMR resistors or TMR devices and by the direction of current flow in case of AMR resistors. Therefore, sensor system 100 will measure $\phi'_{N+1}$ instead of $\phi_{N+1}$. With the estimate $\phi_{N+1}$=$\phi_N$+ωT and ω=($\phi_N$-$\phi_{N-1}$)/T, sensor system 100 can estimate the magnitude of the applied magnetic field with:

$$Ba = \frac{Bw}{\cos(\varphi_N + \omega T)}\left(\frac{\tan(\varphi_N + \omega T)}{\tan(\varphi'_{N+1} - \varphi_N - \omega T)}(1 + \tan(\varphi_N + \omega T)\tan\varphi'_{N+1}) - 1\right)$$

The system can also be used in embodiments to cancel the influence of additional (unwanted) in-plane magnetic fields Bd, or disturbing fields, as long as the in-plane magnitude of the field from the magnet Bm, or the field of the magnet, is known. In an embodiment, system 100 measures the rotation angle three times: (i) without currents through grids 102 and 104, (ii) with Ix in grid 104 only, and (iii) with Iy in grid 102 only. System 200 assumes a specific field Ba pointing in the direction $\phi$ as obtained from the first measurement. Then the By field from Ix during phase (ii) is added, and system 100 compares the predicted result for $\phi$ with the measured one. Any difference is due to a disturbing field, Bd, in the y-direction. Next system 200 adds the Bx field from Iy during phase (iii) and compares the predicted result for $\phi$ with the measured one, with any difference is due to a disturbing field, Bd, in the x-direction.

Figure 7:
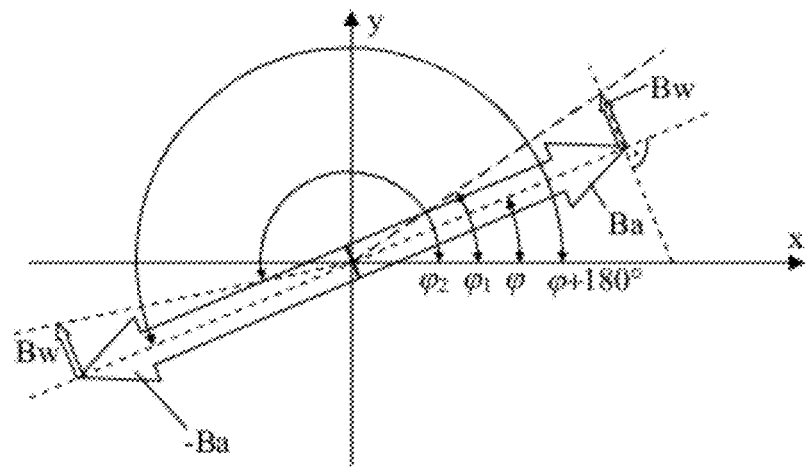
FIG. 7 is a diagram of magnetic fields and angles according to an embodiment.
Figure 8:
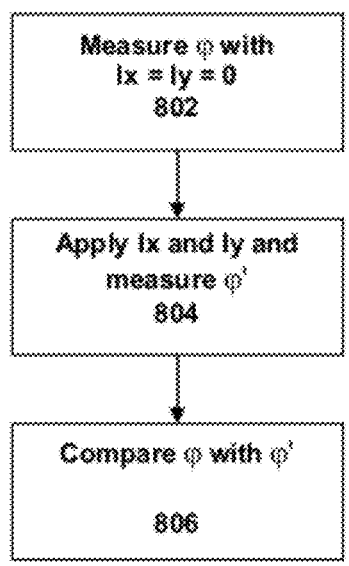
FIG. 8 is a flowchart of a method according to an embodiment.

Referring to FIGS. 7 and 8, embodiments also provide for AMR measurements from 0 degrees to 360 degrees. If the AMR sensor is designed to cover angles from 0 degrees to 180 degrees uniquely without using the current grids, in other words if the AMR sensor is conventional, the sensor can instead cover 0 degrees to about 360 degrees using the methodology depicted in FIG. 8.

At 802, angle cp is measured with Ix=Iy=0. At 804, Ix and Iy are applied to grids 102 and 104 such that Bw is orthogonal to Ba, and Bw points in the positive y-direction, and measure the angle φ'. At 806, the angles are compared. If φ'>φ, the angle is equal to φ. If φ'<φ, the angle is equal to φ+180 degrees.

Embodiments can also reduce and/or eliminate hysteresis in XMR angle sensors. Current grids 102 and 104 can be used to superimpose an orthogonal magnetic dither on the applied magnetic field. If the dither is stronger than the hysteresis, it can cancel the hysteresis. The principle is that the superimposed magnetic dither deletes the magnetic history of the XMR angle sensor so that the sensor reading is identical for rising and falling angles. In embodiments, there are two modes of operation providing essentially the same result: sequential and simultaneous.

In a sequential mode embodiment, the dither can be applied before the angle measurement. Because the sensor system needs to know the direction of the applied field, it needs to use previous measurements of the angle φ. Therefore, the system needs a first estimate of φ after power-on, which is obtained the usual way without dither. With this estimate the system can compute a ratio of the currents Iy/Ix in order to generate a field Bw which is orthogonal to Ba.

Figure 9:
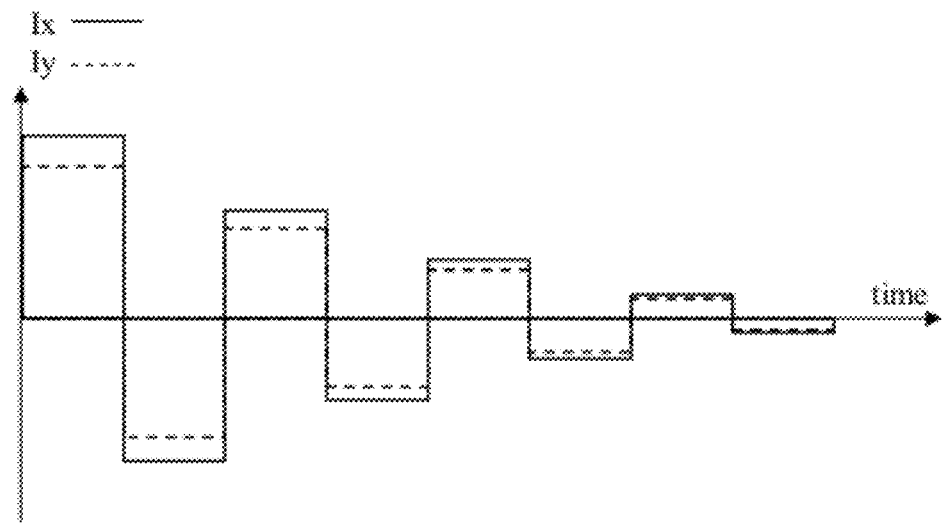
FIG. 9 is a diagram of a demagnetization pattern according to an embodiment.

Then, referring to FIG. 9, a demagnetization pattern as depicted can be applied. The exact timing of the pattern is irrelevant, though in an embodiment it is as fast as possible, because during the pulse the rotation angle cannot be measured. On the other hand, it can be disadvantageous to have extremely high frequencies because high frequencies can cause emission of electromagnetic radiation from the sensor circuit, which is often not wanted. Moreover, the pattern should be slow enough for the XMRs to follow; the soft magnetic domains in the XMRs have a certain inertia and typically cannot follow very quick changes in applied magnetic field. Typical XMR sensors, however, have no difficulties up to several MHz, so the entire pattern can last a few microseconds only. Because the electric circuit of system 200 does not need to follow this signal, the magnetic dither can be applied at high frequencies larger than the baseband of the electronic circuit.

Figure 10:
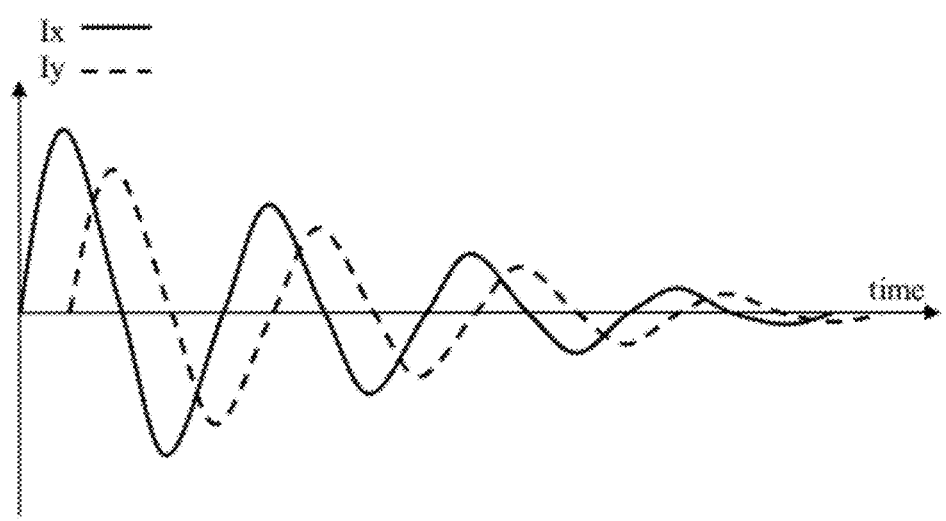
FIG. 10 is a diagram of applied currents according to an embodiment.

It can be advantageous in an embodiment to use the ratio $$\frac{Iy}{Ix} = \frac{Cx}{Cy}\tan(\varphi + /-90°)$$

where φ is the angle of Ba, as Bw is perpendicular to Ba and the excursion of the angle of the total magnetic field (Ba+Bw) is maximized. In an embodiment, it is important to have this angular excursion larger than the hysteresis of the sensor without current grids 102 and 104 in order to smooth down the hysteresis. However, there is no need to achieve extremely high accuracy in the orthogonality of Bw and Ba. If it reduces the complexity of the sensor circuit and the magnitudes of Ix and Iy are not a challenge (i.e. no power limitation), the computation of Iy/Ix can be omitted, with a rotating magnetic dither applied instead of the aforementioned orthogonal magnetic dither. The rotating dither can be generated by applying Ix and Iy both as sine waves with fading amplitude and a 90-degree phase shift between Ix and Iy, as depicted in FIG. 10.

In a simultaneous mode embodiment, the magnetic dither is orthogonal and applied during the measurement of the angle φ. Each measurement of φ can be repeated: (1) during the first measurement, a field Bw orthogonal to Ba is applied, and a first angle is measured; and (2) during the second measurement, a field (−1)*Bw is applied, and a second angle is measured. If the magnetic field rotates clockwise, then the final angle can be computed as the average of the first and second measured angles.

Figure 11:
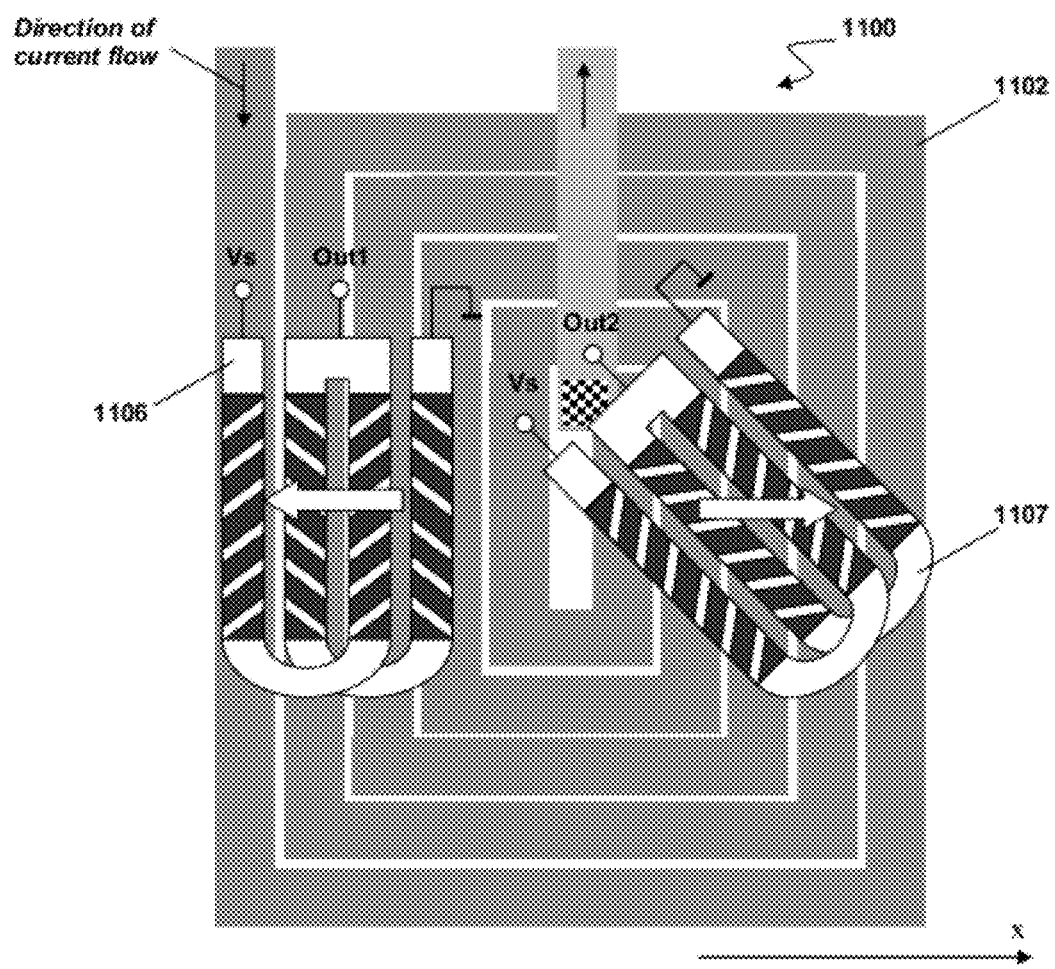
FIG. 11 depicts conductor configuration according to an embodiment.

Referring to FIG. 11, for the purpose of magnetic dither it is not necessary in embodiments to apply the same Bw field on all XMR resistors. Instead, Bw can be applied to one XMR device and (−1)*Bw to another XMR device in an embodiment, which can make the construction of the current grid easier.

For example, suppose in an embodiment there are two AMR half-bridges, the left one comprising two AMR resistors with each resistor having two strips and barber poles at +/−45 degrees to the x-axis. The first resistance with barber poles at +45 degrees to the x-axis is connected between a supply voltage (Vs) and a first output (Out1), and the second resistance with barber poles at −45 degrees to the x-axis is connected between Out1 and a ground potential. The right half-bridge comprises a third AMR resistor having two strips in series, each one with barber poles orthogonal to the x-axis connected between Vs and a second output (Out2), and a fourth AMR resistor having two strips in series, each one with barber poles parallel to the x-axis connected between Out2 and ground potential. The signal of each half bridge is obtained by applying 1 V at Vs and subtracting 0.5 V from Out1 and Out2, respectively. The left half-bridge provides a first output signal of 0.5*AMR/(2+AMR)*sin(2*φ) and the right half bridge provides a second output signal of 0.5*AMR/(2+AMR)*cos(2*φ). Here φ is the angle between the applied field Ba and the x-axis if there is no current flowing through the current grid.

Referring to FIG. 11, a system 1100 comprising the aforementioned structure is depicted, in which a current grid 1102 in the shape of a spiral is disposed below AMR resistors 1106 and 1107. AMR resistors 1106 and 1107 comprise multiplane half-bridge structures as well. The current gives rise to a magnetic field (−1)*Bw on left half bridge 1106 and to a magnetic field Bw on right half bridge 1107. Thus, the magnetic fields on the half bridges 1106 and 1107 point in different directions. System 1100 then collects all signals for both current directions and combines them.

Figure 12:
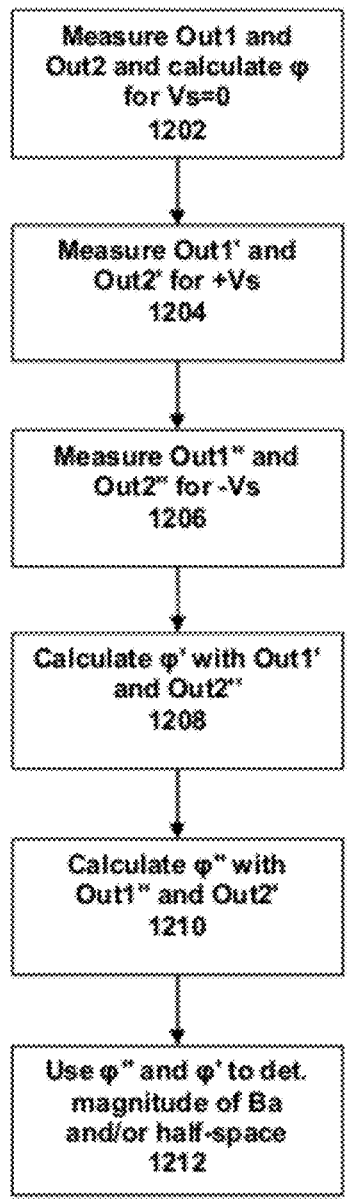
FIG. 12 is a flowchart of a method according to an embodiment.

FIG. 12 depicts a methodology associated with system 1100. At 1202, Out1 and Out2 are measured and φ calculated with no current (Vs=0) applied to conductor 1102. At 1204, a positive current (+Vs) is applied to conductor 1102, and Out1' and Out2' are measured. At 1206, a negative current (−Vs) is applied to conductor 1102, and Out1" and Out2" are measured. At 1208, φ' is calculated using Out1' and Out2". At 1210, φ" is calculated using Out1" and Out2'. At 1212, φ' and φ" can be used to determine the magnitude of Ba and/or the half-space (0-180 degrees vs. 180-360 degrees) of Ba, as discussed above.

Thus, it is not necessary to apply the same Bw field on all XMR resistors of the sensor system. Rather, different Bw fields can be applied on individual XMR strips at one instant in embodiments if the sensor system applies various currents consecutively to the current conductor grid. If the sensor system collects all of this information together, the system can determine the desired values, such as the magnitude of Ba and/or the half-space orientation of Ba.

Figure 13A:
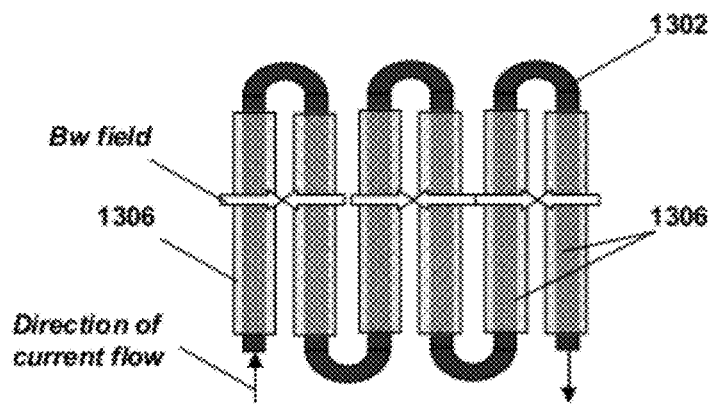
FIG. 13A depicts a conductor configuration according to an embodiment.

For hysteresis cancelation with magnetic dither, as discussed above, it is also possible to apply different magnetic fields to each XMR strip because the sign of the Bw field on each XMR strip is irrelevant. Therefore, serpentine current conductors 1302 as depicted in FIG. 13A can also be used in embodiments. XMR strips 1306 are also shown. As shown, the sign of Bw of current grid 1302 alternates on adjacent XMR strips 1306.

Figure 13B:
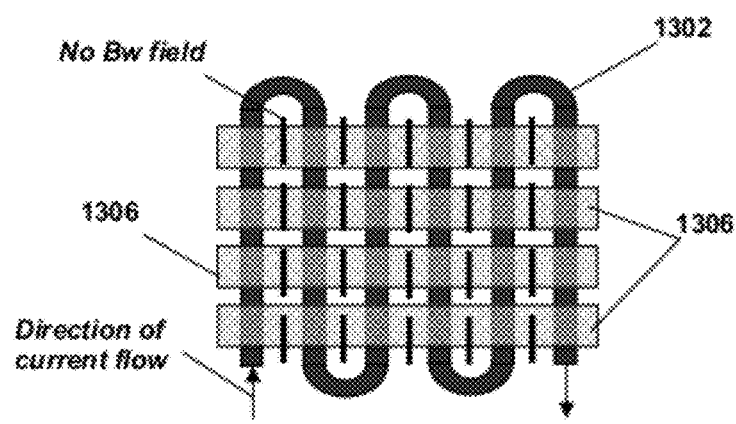
FIG. 13B depicts the conductor configuration of FIG. 13A.

The embodiment of FIG. 13B, however, does not work as well because between two adjacent branches of current conductor 1302 the field Bw is zero at arbitrary currents. This is because the field of adjacent conductors cancels. Therefore, XMR resistors 1306 do not experience any field excursion at the points indicated, and at these positions current grid 1302 generally cannot remove hysteresis effects of the XMR.

Thus, a serpentine can be used once but not for both orthogonal directions to produce orthogonal magnetic dither. Nevertheless, it is possible to use two current grids, where the first is the serpentine as in FIG. 13A and the other one is a spiral as in FIG. 11, for example. If damped sinusoidal currents which are in quadrature (i.e., 90-degree phase shift) are applied in an embodiment, rotating magnetic fields with fading amplitude will be produced, removing the magnetic history of each XMR strip along its entire length.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A magnetoresistive angle sensor comprising:
   a first plurality of conductors arranged in parallel with one another in a first plane to form a first array;
   a second plurality of conductors arranged in parallel with one another in a second plane to form a second array, the second plane being different from and spaced apart from the first plane, and the second plurality of conductors being orthogonally arranged with respect to the first plurality of conductors; and
   at least one magnetoresistive element disposed proximate both the first plane and the second plane; and
   sensor circuitry configured to measure a first angle of an applied magnetic field sensed by the at least one magnetoresistive element with no current in the first or second pluralities of conductors and measure a second angle of an applied magnetic field sensed by the at least one magnetoresistive element with current applied to the first and second pluralities of conductors.

2. The sensor of claim 1, wherein the at least one magnetoresistive element is selected from the group consisting of an anisotropic magnetoresistive (AMR) element, pa tunneling magnetoresistive element (TMR) or a giant magnetoresistive element (GMR).

3. The sensor of claim 1, wherein the first and second pluralities of conductors comprise wires.

4. The sensor of claim 3, wherein the wires comprise one of aluminum or copper.

5. The sensor of claim 1, wherein the first plurality of conductors are serially connected with one another, and the second plurality of conductors are serially connected with one another.

6. The sensor of claim 5, wherein the first of conductors comprises a third plurality of conductors serially connected with the first plurality of conductors and arranged in a third plane different from the first and second planes, and the second plurality of conductors comprises a fourth plurality of conductors serially connected with the second plurality of conductors and arranged in a fourth plane different from the first, second and third planes.

7. The sensor of claim 6, wherein the first and third pluralities of conductors, and the second and fourth pluralities of conductors, are each serially connected by vias.

8. The sensor of claim 1, wherein the first and second planes are parallel.

9. The sensor of claim 8, wherein the at least one magnetoresistive element is arranged in parallel with the first and second planes.

10. The sensor of claim 1, wherein the first and second pluralities of conductors define a perimeter, and wherein the at least one magnetoresistive element is located within the perimeter.

11. The sensor of claim 1, wherein the sensor circuitry is configured to determine a magnitude of an applied magnetic field from the first and second angles.

12. The sensor of claim 11, wherein the sensor circuitry is configured to measure a third angle of the applied magnetic field with a second current of an opposite sign with respect to the first current applied to the first and second pluralities of conductors and to determine the magnitude of the applied magnetic field from the first, second and third angles.

13. The sensor of claim 1, wherein the sensor circuitry is configured to determine an angular half-space or an applied magnetic field from the first and second angles.

14. The sensor of claim 1, wherein the sensor circuitry is configured to apply a dither to at least one of the first and second pluralities of conductors to reduce hysteresis in the sensor.

15. The sensor of claim 14, wherein the dither comprises a demagnetization pattern.

16. A method comprising:
   providing a first plane of parallel conductors spaced apart from and orthogonally arranged relative to a second plane of parallel conductors;
   providing at least one magnetoresistive element proximate both the first and second planes;
   measuring a first angle of an applied magnetic field with no current applied to the first or second planes of parallel conductors; and measuring a second angle of an applied magnetic field with current applied to the first and second planes of parallel conductors.

17. The method of claim 16, further comprising determining as magnitude of the applied magnetic field from the first and second angles.

18. The method of claim 16, further comprising:
measuring a third angle of the applied magnetic field with a second current of an opposite sign with respect to the current applied, to the first and second planes of conductors; and
determining a magnitude of the applied magnetic field from the first, second and third angles.

19. The method of claim 16, further comprising determining an angular half-space of the applied magnetic field from the first and second angles.

20. The method of claim 16, further comprising applying a dither to at least one of the first and second planes of conductors to reduce hysteresis.

21. A method comprising:
providing a first conductor comprising a plurality of serially connected conductor portions arranged substantially in parallel;
providing a second conductor comprising a plurality of serially connected conductor portions arranged substantially in parallel;
providing at least one magnetoresistive element;
arranging the first and second conductors substantially parallel to and spaced apart from one another, the conductor portions of the first conductor being substantially perpendicular with respect to the conductor portions of the second conductor;
arranging the at least one magnetoresistive element substantially parallel to and proximate the first and second conductors;
applying a first magnetic field;
measuring a first angle of the first magnetic field;
inducing a second magnetic field by causing current to flow in at least one of the first or second conductors; and
measuring a second angle of a magnetic field resulting from the first magnetic field and the second magnetic field.

22. The method of claim 21, further comprising coupling sensor circuitry to the at least one magnetoresistive element, wherein measuring the first angle and measuring the second angle are carried out by the sensor circuitry.

23. The method of claim 21, further comprising determining a magnitude of the first magnetic field from the first and second angles.

24. The method of claim 21, further comprising determining a half-space of the first angle from the first and second angles.

25. The method of claim 16, further comprising:
applying the current such that a magnetic field induced by the current is orthogonal to the applied magnetic field; and
comparing the first angle and the second angle.

\* \* \* \* \*